United States Patent [19]

Becker et al.

[11] Patent Number: 5,631,042
[45] Date of Patent: May 20, 1997

[54] GRAFFITI-RESISTANT BARRIERS, RELATED COMPOSITIONS AND METHODS24M

[75] Inventors: Foster S. Becker, 11650 Holly Springs Dr., St. Louis, Mo. 63146; Bruce R. Maier, Columbia, Mo.

[73] Assignee: Foster S. Becker, St. Louis, Mo.

[21] Appl. No.: 540,123

[22] Filed: Oct. 6, 1995

[51] Int. Cl.$^6$ ..................... B05D 5/08
[52] U.S. Cl. ............. 427/154; 427/354; 427/393.6; 427/421; 427/429
[58] Field of Search ............. 427/154, 155, 427/156, 352, 353, 354, 393.6, 421, 429; 428/425.5, 540; 525/57, 58

[56] References Cited

U.S. PATENT DOCUMENTS

| | | | |
|---|---|---|---|
| 4,169,088 | 9/1979 | Hansen | 260/29.6 WB |
| 4,241,141 | 12/1980 | Douglas . | |
| 4,347,266 | 8/1982 | Norman et al. | 427/154 |
| 4,431,763 | 2/1984 | Reed . | |
| 4,748,049 | 5/1988 | Charles et al. . | |
| 4,814,373 | 3/1989 | Frankel et al. . | |
| 5,010,131 | 4/1991 | Wagner . | |
| 5,133,997 | 7/1992 | Maier et al. | 427/385.5 |
| 5,302,413 | 4/1994 | Woodhall . | |
| 5,387,434 | 2/1995 | Black | 427/154 |
| 5,418,006 | 5/1995 | Roth et al. | 427/154 |
| 5,426,151 | 6/1995 | Brandt et al. | 525/100 |

OTHER PUBLICATIONS

CA + Derwent Abstracts of FR 2684682, Jun. 1993.
CA + Derwent Abstracts of BE 867438, Sep. 1978.
CA + Derwent Abstracts of FR 2607821, Jun. 1988.
Material Safety Data Sheet from Rohm and Haas Company for KATHON®LX, dated Jan. 6, 1995.
Material Safety Data Sheet from SASF Corporation for N-Methyl-2-pyrrolidone, dated Jan. 12, 1993.
Material Safety Data Sheet from Dow Corning Corporation for Dow Corning 200, dated May 19, 1995.
Material Safety Data Sheet from OSi Specialties, Inc. for A-1106, dated Mar. 9, 1994.
Material Safety Data Sheet from BYK-Chemie USA for BYK-307, dated Jun. 30, 1991.
Material Safety Data Sheet from Zeneca Resins for NeoRaz R-9679, dated Sep. 29, 1993.
Material Safety data Sheet from Reichhold Chemicals, Inc. for Spensol, dated Apr. 18, 1994.
Material Safety Data Sheet from Shamrock Technologies Inc. for Polytetrafluoroethylene Dispersion, dated Apr. 1, 1993.
Material Safety Data Sheet from W.R. Grace & Co. for Syloid® 7000, dated Aug. 21, 1992.
Material Safety Data Sheet from Air Products and Chemicals, Inc. for Flexthane® 610, 611, 620, 622, 623 Emulsions, dated Jul., 1994.
Material Safety Data Sheet from Ciba Additives for Tinuvin 1130, dated Jul. 27, 1994.
Material Safety Data Sheet from DuPont for "Zonyl" FSA Fluorosurfactant, dated Mar. 30, 1995.
Material Safety Data Sheet from Bush Boake Allen for TABS-DS, dated Aug. 22, 1990.
Material Safety Data Sheet from Air Products and Chemicals, Inc. for Airvol® 103, 107, 125, 165, 305, 321, 325, 340, 350, 605, 710, 7125, 714, 725, 7325, 825, 8103, 8225, 107S, 125S, 125U, 165S, 325S, 350S, 103NF, 107LA, 107SF, 125SF, 325TG, 350SF, 825WS, dated May, 1994.
Material Safety Data Sheet from DuPont for Teflon, dated May 27, 1994.

*Primary Examiner*—Katherine A. Bareford
*Assistant Examiner*—Erma Cameron
*Attorney, Agent, or Firm*—Howell & Haferkamp, L.C.

[57] ABSTRACT

A composition useful for preparation of a graffiti-resistant barrier coating, related methods and compositions. The composition comprises from about 0.1 to about 30 percent by weight polyvinyl alcohol of molecular weight from about 7,000 to about 120,000 and being at least about 50% hydrolyzed; from about 0.1 to about 30 percent by weight non-stick agent such as silicone or polytetrafluoroethylene; and from about 0.1 to about 40 percent by weight adhesion promoter such as a urethane composition.

22 Claims, No Drawings

GRAFFITI-RESISTANT BARRIERS, RELATED COMPOSITIONS AND METHODS24M

BACKGROUND OF THE INVENTION

1. Field of the Invention

The present invention relates to compositions and methods for formation of coatings that permit easy removal therefrom of markings such as graffiti, and more particularly to non-stick polymer coatings useful as such graffiti-resistant barriers.

2. Description of the Prior Art

Graffiti is a common problem encountered in areas of access to the general public. Moreover, generally, unwanted markings on surfaces can occur almost anywhere. For example, walls in homes may be marked accidentally or by children, and in the workplace walls and other surfaces may be marked inadvertently or unavoidably for any of a number of reasons. Graffiti is often in the form of paint, such as spray paint, but graffiti and other markings may be applied by markers, crayons, and other writing fluids. As used herein, the term "graffiti" will be used to refer broadly to unwanted markings, whether consisting of paint, such other fluids or other unwanted markings, scuff marks and the like.

Such markings are particularly troublesome because they are often very difficult to remove from the surfaces on which they have been applied. Thus, painted surfaces often must be repainted to cover up the markings and sometimes must be even stripped and then repainted. For example, graffiti often is applied with paint similar to that on the surface. Removal of the graffiti paint by abrasion or with a solvent therefore is impractical because it typically results in removal of at least a portion of the underlying paint. Unpainted surfaces sometimes must be sandblasted to remove the markings.

Accordingly, a coating composition is desired that would serve as a barrier to permit easy removal of such markings. Preferably, the coating would be applicable to existing surfaces, including painted surfaces without adversely affecting the appearance of the surface. Moreover, it would be further desirable if the coating composition were formulateable to provide a graffiti-resistant paint, thus obviating any need for a paint coating and an additional and separate coating to provide such protection. However, the coating should be tough and durable to providing a lasting finish.

SUMMARY OF THE INVENTION

Briefly, therefore, the present invention is directed to a novel composition useful for preparation of a graffiti-resistant barrier coating. The composition comprises from about 0.1 to about 30 percent by weight polyvinyl alcohol of molecular weight from about 7,000 to about 120,000 and being at least about 50% hydrolyzed, from about 0.1 to about 30 percent by weight non-stick agent, and from about 0.1 to about 40 percent by weight adhesion promoter.

The present invention is also directed to a novel method for coating a substrate with a graffiti-resistant barrier. According to the method, the noted composition further comprises a solvent, and the composition is applied to the substrate and allowed to dry.

The present invention is further directed to a novel graffiti-resistant coating on a substrate, the coating having been produced by application to the substrate of the noted composition.

The present invention is still further directed to a novel graffiti-resistant film comprising from about 0.1 to about 30 parts by weight polyvinyl alcohol of molecular weight from about 7,000 to about 120,000 and being at least about 50% hydrolyzed, from about 0.1 to about 30 parts by weight non-stick agent, and from about 0.1 to about 40 parts by weight adhesion promoter.

Among the several advantages found to be achieved by the present invention, therefore, may be noted the provision of a composition and method for producing a graffiti-resistant barrier; the provision of such composition and method for producing a barrier on a surface that permits easy removal of graffiti and similar markings from the surface without destruction of the surface; the provision of such composition that may be applied as a paint to a surface to produce a painted surface that may be easily cleaned of graffiti and similar markings; and the provision of a graffiti-resistant barrier on such surfaces and a method for providing such barrier.

DESCRIPTION OF THE PREFERRED EMBODIMENTS

In accordance with the present invention, it has been discovered that a composition comprising from about 0.1 to about 30 percent by weight polyvinyl alcohol of molecular weight from about 7,000 to about 120,000 and being at least about 50% hydrolyzed, from about 0.1 to about 30 percent by weight non-stick agent, and from about 0.1 to about 40 percent by weight adhesion promoter, provides a tough and durable non-stick finish that is surprisingly resistant to adherence thereto by standard paints and other writing fluids. Thus, such paints and other fluids may be wiped off easily by rubbing with a cloth and, optionally, water or other solvent, without destruction of the finish. Moreover, the composition is transparent and may be formulated to provide a flat or glossy finish to complement, or to avoid obstruction of, the original surface or its finish, if any. On the other hand, the composition may be formulated with a pigment and applied as a durable, yet non-stick, paint to a surface.

The composition may be formulated by mixing together the ingredients therefor. The basic ingredients, as noted, include polyvinyl alcohol, a non-stick agent, and an adhesion promoter. Most of the ingredients are solids such as powder (for example, polyurethane powder), but some are available and may be employed in solutions, emulsions or suspended in liquid. The concentrations of the ingredients as expressed below, however, are of solids or active components.

Thus, the coating composition comprises about 0.1 to about 30, preferably about 0.1 to about 10, more preferably about 0.1 to about 7, especially about 3 to about 7, optimally about 6 to about 7, percent by weight (based on total composition, including solvent) polyvinyl alcohol. About 3% by weight polyvinyl alcohol has been discovered to provide a sacrificial coating. A sacrificial coating is removed along with the markings therein, therefore requiring reapplication after cleaning. However, at about 6 to about 7 percent by weight polyvinyl alcohol, a durable coating is formed. At about 8 percent by weight polyvinyl alcohol or higher, it has been found that the composition has a viscosity undesirably high for low temperature applications, and the viscosity tends to drift over time as well, limiting the shelf life of the composition. However, high temperature applications might require such higher viscosities and therefore higher polyvinyl alcohol contents.

Although it is believed that any polyvinyl alcohol would be acceptable, preferred polyvinyl alcohols have a molecular weight of from about 7,000 to about 120,000, for example, from about 50,000 to about 120,000. Further, the polyvinyl alcohol should be at least about 50% hydrolyzed to minimize water solubility so that the coating will not be susceptible to washing away. In particular, the polyvinyl alcohol, as well as the other ingredients not to be evaporated away during curing of the coating, should not be water soluble—at least at the temperatures which the coating is intended to endure, such as during a hot rain. Thus, the polyvinyl alcohol and other ingredients intended to remain solid during the life of the coating should be water insoluble at temperatures below about 200° F. The same may apply as well for solubility in other solvent to which the coating may be exposed, such as cleaning solvents or turpentine. However, for easy removal with hot water or steam, it also may be desirable that at least one of such ingredients be water soluble at slightly above 200° F., such as at about 212° F. Moreover, it also has been found that a greater degree of hydrolyzation, as well as a relatively high molecular weight imparts to polyvinyl alcohols greater temperature resistance, which helps maintain the durability of the composition and resulting coating made therefrom in hot weather and other high temperature conditions. The water temperature at which a composition or ingredient begins to break down is referred to as the water temperature resistance. Accordingly, a water temperature resistance of greater than about 180° F. is desirable if the coating is to be exposed to weather. On the other hand, if it is desired to remove the coating with steam, the water temperature resistance should not be much greater than 180° F., such as about 230° F. or less.

And to maintain the integrity of the coating, the melting points of the polyvinyl alcohol (as well as the other solid ingredients) or the temperatures at which the ingredients degrade should be in excess of that to which the final coating is to be exposed. For example, the melting points of the ingredients and the temperatures at which ingredients degrade for coatings exposed to outdoors should be at least about 180° F. On the other hand, if it is desired to be able to remove the coating with steam, such temperature should not be much higher than 180° F., such as about 212° F.

Thus, polyvinyl alcohols that are about 50% to 100% hydrolyzed, preferably about 80% to 100% hydrolyzed are believed suitable. And, although complete (100%) hydrolyzation is desirable, commercial products tend to be less than completely hydrolyzed and hydrolyzation levels of about 85% to about 99.9% (for example, 99.3%) are highly suitable. For instance, when a PVA having about an 85% to 99.9% level of hydrolyzation and a molecular weight of about 70,000 to about 101,000 is used in the composition, the coating formed from the composition has been found to break down at about 212° F. to about 230° F., and steam may be used to remove the coating. A particular polyvinyl alcohol that has been found to yield a superior coating is sold under the trade designation Airvol 165, a super and fully hydrolyzed polyvinyl alcohol product of Air Products and Chemicals, Inc. further containing a small amount (less than about 2.5%) sodium acetate and a small amount (less than about 3%) methyl alcohol.

The composition should contain about 0.1 to about 30, preferably about 0.1 to about 10, more preferably about 0.1 to about 5, such as about 0.7, percent by weight non-stick agent. The non-stick agent prevents the unwanted paint or other writing fluid from adhering to the coating. An acceptable non-stick agent is a mixture of silicone and Teflon (a trade designation of E. I. du Pont de Nemours & Co., Inc. for tetrafluoroethylene ("TFE") fluorocarbon resins, sometimes referred to as polytetrafluoroethylene).

Any of a wide range of silicones may be employed, such as Dow Corning 51 additive (a translucent white viscous liquid silicone compound which contains about 57% hydroxy-terminated dimethyl siloxane, about 20% water, about 7% treated silica and about 14% $C_{11}$ to $C_{15}$ ethoxylated secondary alcohols), BYK Chemie USA's BYK-307 (polyether modified dimethylpolysiloxane copolymer containing 3% xylene and used commercially as a paint additive) and other water reducible (i.e., soluble or dispersible) products. Similarly any of a variety of Teflon products may be used, including not only Du Pont products such as MP1200, but also reprocessed Teflon, such as Shamrock Technologies Inc.'s HydroCERF 9174, a polytetrafluoroethylene dispersion having the consistency of a paste that is dispersible in water and which is understood to be reprocessed Teflon suspended in water.

It has been discovered that this silicone/Teflon mixture imparts to the coating the double advantage of good adhesion to the substrate to which it is applied in combination with good wear properties. By contrast, if silicone is employed without Teflon, it has been found that the coating does not adhere well to the substrate and, if Teflon is employed without silicone, the coating wears very poorly. Although the relative weight proportion of these two ingredients may be within the range of from about 1:600 to about 600:1, preferably about 1:200 to about 200:1, and more preferably from about 1:100 to about 100:1, it has been found that the optimal weight ratio is about 1:1. Thus, it is preferred that each of the two ingredients be present in the total composition in an amount of at least about 0.05 percent by weight.

The composition further should comprise about 0.1 to about 40, preferably about 0.1 to about 20, more preferably about 0.1 to about 10, such as about 0.1 to about 5, percent by weight adhesion promoter. The adhesion promoter facilitates the adhesion of the coating onto the substrate to be coated. Preferably, the adhesion promoter should be resistant, at least after curing (i.e., after evaporation of the water or other solvent from the composition after application to the substrate), to degradation or dissolution by water or standard cleaning solvents, and especially organic solvents, particularly turpentine (i.e., spirits of turpentine) and other paint solvents or thinners, so that rain or washing will not harm the coating. Thus, optimal adhesion promoters are insoluble, inert and non-degradable in water and such solvents, at least after curing. On the other hand, the adhesion promoter should be sufficiently dispersible in the coating composition, and thus the solvent thereof, to avoid premature settling out prior to application of the composition to a surface.

A suitable adhesion promoter has been found to be a mixture of a urethane and acrylic hybrid, specifically a cross-linked acrylic urethane, and a urethane (i.e., a polyurethane). Preferably, the cross-linked acrylic urethane has a molecular weight of from about 50,000 to about 1,500,000. An especially suitable adhesion promoter has been found to be a urethane hybrid polymer sold in a mixture further comprising less than 1.1% triethylamine, 3 to 7% N-methylpyrrolidone, more than 50% water and less than 0.1% 2-propenoic acid, butyl ester, under the designation Flexthane 620 or the designation Flexthane 630 by Air Products and Chemicals, Inc. as an adhesive. Although this product is soluble in alcohol, allowing easy removal when desired, it has the advantage of the insolubility and non-degradation characteristics noted above.

A suitable urethane has been found to be Spensol L54-MPW-32, sold by Reichhold Chemicals Inc. This product is referred to as a water dispersible polyurethane lacquer and comprises up to about 32% urethane polymer, up to 49% water, up to 16% N-methyl-2-pyrrolidone and up to 3% triethylamine. The preferred acrylic urethane to urethane weight ratio of the adhesion promoter is from about 1:1 to about 1:2. If a non-aqueous coating composition is prepared, it is believed that a polyester may be employed as an alternative to the noted adhesion promoter mixture.

This adhesion promoter is useful for aiding adhesion of the coating composition to relatively porous smooth surfaces such as dry-wall, plastic or dry paint. However, for rough surfaces such as brick, the adhesion promoter should further comprise organofunctional silanes, particularly organosilane esters such as amino alkyl silicones, such as Silquest A-1106 sold by OSi Specialties Inc., which is an aqueous solution comprising less than 50% 3-aminopropyl-silanetriol, more than 50% water and less than 2% ethanol. Such silanes are known for their usefulness in composites for linking organic polymers to inorganic substrates.

The composition may further comprise any of a variety of solvents or combination of solvents. As noted above, many of the ingredients already discussed come in mixtures containing solvents as well as other minor components and those solvents and other components therefore end up in the final composition. Further amounts of those solvents, such as water and methyl pyrrolidone, and other components, as well as other ingredients, may be added to the composition. The composition should comprise a solvent or solvents of a type and in an amount that provides a fluent mixture for application onto a substrate by conventional means (such as by paint application techniques, for example, brushing or rolling on), but that dries or "cures" within an acceptable period of time and under acceptable conditions, such as ambient. "Drying" or "curing" as used herein refers to evaporation of enough solvent in the composition that the composition is no longer fluent, but hardens to form a relatively durable coating as described herein. Although the composition may be cured by simple exposure to ambient conditions, alternatively it may be cured by other means, such as by blowing hot, dry air on it. After such drying or curing, of course, the polyvinyl alcohol, non-stick agent and adhesion promoter remain in their same proportions relative to each other, but due to loss of solvent, their concentrations relative to total composition increase.

The composition as described is transparent and so may be used to coat surfaces or finishes thereof whose visibility are desired to be maintained without masking or obscuring the surface or finish. The composition dries to a glossy finish, but standard flattening agents may be incorporated into the composition to maintain the appearance of the original surface or finish, or to achieve the appearance desired. Flattening agents are well known in the paint industry and include, for example, a synthetic amorphous silica that is surface-treated with hydrocarbon-type wax and is sold by the Davison Chemical Division of W. R. Grace & Co. under the trade designation Syloid 7000.

The composition further may include a pigment. Any standard pigment known in the art is believed to be acceptable. Thus, the composition may be employed as a paint that is resistant to graffiti.

Further the composition may include any of a number of additional ingredients. For example, it may include a UVprotector, such as Tinuvin 1130 or any other UVprotector known in the art, to absorb ultraviolet radiation. Tinuvin 1130 is a trade designation of Ciba-Geigy Corporation for poly(oxy-1,2-ethanediyl)-alpha-[3-[3-(2H-benzotriazol-2-yl)-5-(1,1-dimethylethyl)-4-hydroxyphenyl]-1-oxopropyl]-omega-[3-[3-(2H-benzotriazol-2-yl)-5-(1,1-dimethylethyl)-4-hydroxyphenyl]-1-oxopropoxy]-and poly(oxy-1,2-ethanediyl)-alpha-[3-[3-(2H-benzotriazol-2-yl)-5-(1,1-dimethylethyl)-4-hydroxyphenyl]-1-oxopropyl]-omega-hydroxy- in polyethylene glycol. The composition also may comprise a biocide as is known in the art, such as Kathon LX 1.5% biocide. Kathon LX is a trade designation of Rohm and Haas Company for an aqueous mixture of 5-chloro-2-methyl-4-isothiazolin-3-one, 2-methyl-4-isothiazolin-3-one, magnesium chloride, magnesium nitrate and copper nitrate trihydrate.

Other optional ingredients include, for example, fluorosurfactants such as that sold by Du Pont under the trade designation Zonyl FSA, hardness and flexibility aids for film enhancement such as a polyurethane aqueous dispersion available as NeoRez R-9679 sold by Zeneca Resins, and N-methyl pyrrolidone, which may serve not only as a solvent as noted, but as a film flexibility aid as well. Zonyl FSA is an aqueous mixture of lithium 3-[(1H,1H,2H,2H-fluoroalkyl)thio]propionate, telomer B 2-carboxyethyl sulfide and isopropyl alcohol. NeoRez R-9679 is an aqueous dispersion of 1-methyl-2-pyrrolidone (N-methyl pyrrolidone) and triethylamine. The optional ingredients should not adversely affect the noted desired properties of the composition such as fluency in application, bonding with the substrate, effective and rapid curing and so forth, and should not interfere with the transparency of the composition or, if the composition contains a pigment, should not interfere with obtaining the desired color coating.

The ingredients may be blended together by simple addition in any order under agitation. However, a preferred order is to begin with water and to add the ingredients in the order set forth above in the description of the ingredients, and substantial agitation and even heating to about 212° F. may be beneficial or necessary to maintain suspension at least for the incorporation of the polyvinyl alcohol into water. After addition of the polyvinyl alcohol to the water, the rate of agitation may be decreased, but the temperature is preferably maintained.

The resulting compositions may then be applied to a substrate by any standard means for applications of paints and other coatings and then cured or allowed to cure such as by evaporation of water and/or other solvent to produce a graffiti-resistant finish. For example, the composition may be brushed on, rolled on or, in appropriate formulation, even sprayed on.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

Tap water (630 lbs.) was added to a clean tank and then Airvol 165 (54.6 lbs.) polyvinyl alcohol was added over a ten minute period to the tap water under agitation with a dispersing blade at high speed. The resulting mixture was heated under slow agitation to 212° F. and then transferred to a dispersing tank, cooled, placed under a high speed disperser and agitated at high speed. Syloid 7000 (7.8 lbs.) flattening agent (amorphous silica treated with hydrocarbon-type wax) then was sifted into the mixture slowly. Then following ingredients then were added in the following order:

Dow Corning 51 silicone (2.9 lbs.)
HydroCERF 9174 reprocessed Teflon (9.8 lbs.)
Tinuvin 1130 UV inhibitor (3.8 lbs.)
Silquest A-1106 organosilane (12.5 lbs.)
Kathon LX mildecide (0.52 lbs.)
Methyl pyrrolidone (0.82 lbs.)
Flexthane 620 acrylic urethane (79 lbs.)
Spensol L54MPW-32 urethane (15.8 lbs.)
Zonyl FSA fluorosurfactant (7.87 lbs.)
NeoRez R-9679 resin (15.8 lbs.)

The viscosity was tested to confirm that it was in the range of 80 to 100 K.U. and the dry time, gloss and release properties were tested. A graffiti-resistant coating was formed on a variety of surfaces.

EXAMPLE 2

Airvol 165 polyvinyl alcohol (66.3 lbs.) was blended into water (760 lbs.) that had been heated to 212° F. Ground Syloid 7000 flattener (9.33 lbs.) was added, followed addition by BYK-307 silicone (3.57 lbs.), ground HydroCERF 9174 Teflon (11.9 lbs.), ground Tinuvin 1130 UV inhibitor (4.66 lbs.), A-1106 organosilane (15.1 lbs.), Kathon LX bactericide (0.667 lbs.), methyl pyrrolidone (1.026 lbs.), Flexthane 620 urethane/acrylic (96 lbs.), L54 urethane (19.2 lbs.) and 9679 urethane (19.2 lbs.), in that order. A clear coating composition (100 gallons) was produced that, upon drying, formed a graffiti-resistant barrier on a wide variety of surfaces.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed:

1. A method for coating a substrate with a graffiti-resistant barrier, comprising applying to the substrate a composition comprising (a) from about 0.1 to about 30 percent by weight polyvinyl alcohol of molecular weight from about 7,000 to about 120,000 and being at least about 50% hydrolyzed;

(b) from about 0.1 to about 30 percent by weight non-stick agent selected from the group consisting of silicone, polytetrafluoroethylene and mixtures thereof;

(c) from about 0.1 to about 40 percent by weight adhesion promoter comprising (i) a mixture of urethane and a cross-linked acrylic urethane or (ii) if the composition is non-aqueous, either such mixture or a polyester; and (d) a solvent;

and allowing the composition to dry.

2. A method as set forth in claim 1 wherein the non-stick agent consists essentially of silicone and polytetrafluoroethylene in amounts sufficient that each of the silicone and the polytetrafluoroethylene make up at least about 0.5 percent by weight of the composition, and the adhesion promoter consists essentially of urethane and cross-linked acrylic urethane.

3. A method as set forth in claim 1 wherein the solvent is water.

4. A method as set forth in claim 2 wherein the solvent is water.

5. A method as set forth in claim 2 wherein the composition comprises from about 3 to about 7 percent polyvinyl alcohol.

6. A method as set forth in claim 5 wherein the polyvinyl alcohol has a water temperature resistance of greater than about 180° F.

7. A method as set forth in claim 6 wherein the adhesion promoter consists essentially of urethane and cross-linked acrylic urethane in a urethane to crosslinked acrylic urethane weight ratio of from about 1:1 to about 1:2.

8. A method as set forth in claim 7 wherein the composition is applied to the substrate by brushing the composition onto the substrate.

9. A method as set forth in claim 7 wherein the composition is applied to the substrate by spraying the composition onto the substrate.

10. A method as set forth in claim 7 wherein the substrate is dry wall.

11. A method as set forth in claim 1 wherein the adhesion promotor consists essentially of organosilane ester, urethane and cross-linked acrylic urethane.

12. A method as set forth in claim 11 wherein the non-stick agent consists essentially of silicone and polytetrafluoroethylene in amounts sufficient that each makes up at least about 0.05 percent by weight of the composition.

13. A method as set forth in claim 12 wherein the solvent is water.

14. A method as set forth in claim 12 wherein the composition comprises from about 3 to about 7 percent polyvinyl alcohol.

15. A method as set forth in claim 14 wherein the polyvinyl alcohol has a water temperature resistance of greater than about 180° F.

16. A method as set forth in claim 15 wherein the composition comprises from about 0.1 to about 10 percent by weight of the non-stick agent and from about 0.1 to about 20 percent by weight of the adhesion promoter.

17. A method as set forth in claim 16 wherein the composition comprises from about 0.1 to about 5 percent by weight of the non-stick agent and from about 0.1 to about 5 percent by weight of the adhesion promoter.

18. A method as set forth in claim 17 wherein the composition is applied to the substrate by brushing the composition onto the substrate.

19. A method as set forth in claim 17 wherein the composition is applied to the substrate by spraying the composition onto the substrate.

20. A method as set forth in claim 17 wherein the substrate is brick.

21. A method as set forth in claim 5 wherein the composition comprises from about 0.1 to about 10 percent by weight of the non-stick agent and from about 0.1 to about 20 percent by weight of the adhesion promoter.

22. A method as set forth in claim 21 wherein the composition comprises from about 0.1 to about 5 percent by weight of the non-stick agent and from about 0.1 to about 5 percent by weight of the adhesion promoter.

* * * * *